US012645499B2

(12) United States Patent
Kim-Koon et al.

(10) Patent No.: US 12,645,499 B2
(45) Date of Patent: Jun. 2, 2026

(54) INTELLIGENT PREEMPTION SYSTEM

(71) Applicant: Snap Inc., Santa Monica, CA (US)

(72) Inventors: Edward Lee Kim-Koon, Venice, CA (US); Farid Zare Seisan, San Diego, CA (US)

(73) Assignee: Snap Inc., Santa Monica, CA (US)

( * ) Notice: Subject to any disclaimer, the term of this patent is extended or adjusted under 35 U.S.C. 154(b) by 679 days.

(21) Appl. No.: 17/718,008

(22) Filed: Apr. 11, 2022

(65) Prior Publication Data

US 2023/0325243 A1     Oct. 12, 2023

(51) Int. Cl.
G06F 9/50 (2006.01)

(52) U.S. Cl.
CPC .................................. G06F 9/5027 (2013.01)

(58) Field of Classification Search
CPC ....... G06F 9/5027; G06F 9/485; G06F 9/4887
See application file for complete search history.

(56) References Cited

U.S. PATENT DOCUMENTS

| | | | | |
|---|---|---|---|---|
| 7,451,447 | B1 * | 11/2008 | Deshpande | ........... G06F 9/4812 |
| | | | | 718/103 |
| 2014/0114717 | A1 * | 4/2014 | Davis | ................. G06Q 10/1097 |
| | | | | 705/26.5 |
| 2018/0373562 | A1 * | 12/2018 | Roberts | ................. G06F 9/4887 |
| 2020/0272444 | A1 | 8/2020 | Nilsen | |
| 2021/0312241 | A1 * | 10/2021 | Kaufmann | .......... G06F 18/2185 |
| 2022/0301095 | A1 * | 9/2022 | Dagani | ..................... G06T 1/20 |
| 2023/0297416 | A1 * | 9/2023 | Covell | .................. G06F 9/5072 |
| | | | | 718/104 |

FOREIGN PATENT DOCUMENTS

| | | |
|---|---|---|
| EP | 2581829 | 4/2013 |
| WO | 2006016283 | 2/2006 |
| WO | WO-2023200636 A1 | 10/2023 |

OTHER PUBLICATIONS

"International Application Serial No. PCT US2023 017463, International Search Report mailed Jul. 4, 2023", 3 pgs.
"International Application Serial No. PCT US2023 017463, Written Opinion mailed Jul. 4, 2023", 7 pgs.
"International Application Serial No. PCT/US2023/017463, International Preliminary Report on Patentability mailed Oct. 24, 2024", 9 pgs.

* cited by examiner

*Primary Examiner* — Pierre Vital
*Assistant Examiner* — Abdou K Seye
(74) *Attorney, Agent, or Firm* — Schwegman Lundberg & Woessner, P.A.

(57) ABSTRACT

Systems and methods herein describe an intelligent preemption system. The preemption system identifies a high priority task and a low priority task that are running on a processor, estimates a preemption save time and an execution time for the low priority task using a machine learning model trained to analyze historical preemption data, determines that the estimate preemption save time for the low priority task satisfies a first preemption condition and that the estimated execution time for the low priority task satisfies a second preemption condition, and in response to determining first preemption condition and second preemption condition are satisfied, scheduling a preemption event associated with the high priority task and the low priority task.

20 Claims, 7 Drawing Sheets

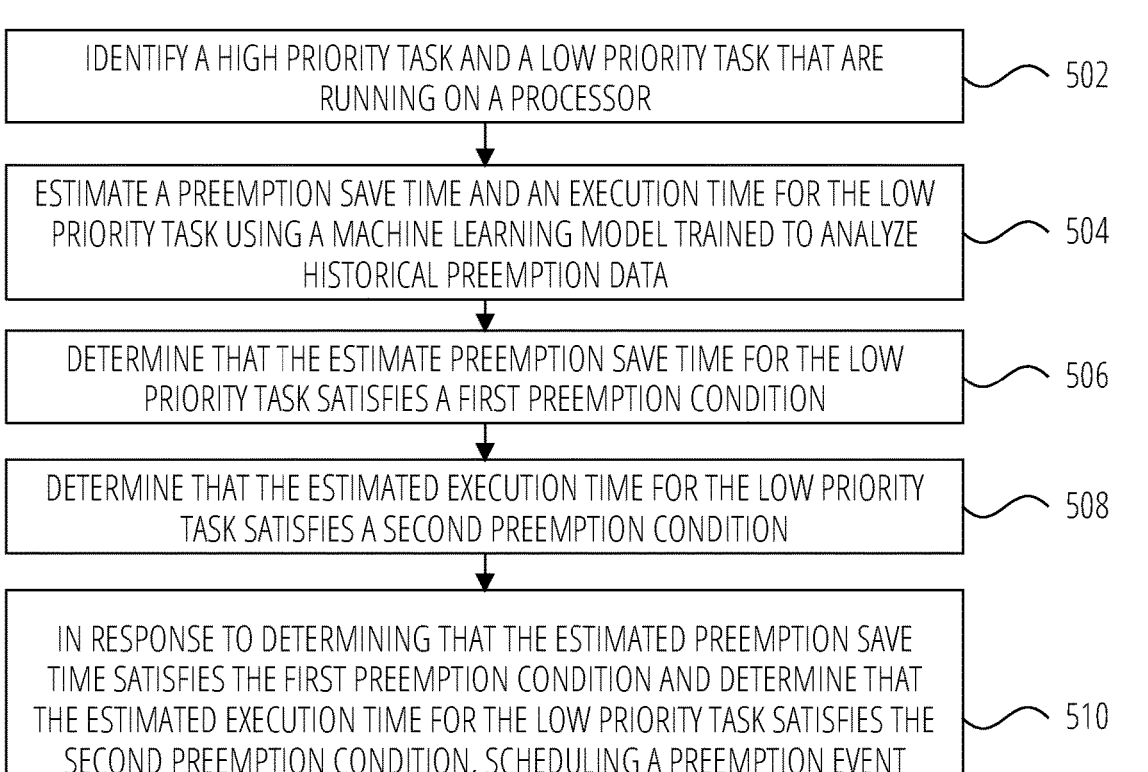

IDENTIFY A HIGH PRIORITY TASK AND A LOW PRIORITY TASK THAT ARE RUNNING ON A PROCESSOR — 502

ESTIMATE A PREEMPTION SAVE TIME AND AN EXECUTION TIME FOR THE LOW PRIORITY TASK USING A MACHINE LEARNING MODEL TRAINED TO ANALYZE HISTORICAL PREEMPTION DATA — 504

DETERMINE THAT THE ESTIMATE PREEMPTION SAVE TIME FOR THE LOW PRIORITY TASK SATISFIES A FIRST PREEMPTION CONDITION — 506

DETERMINE THAT THE ESTIMATED EXECUTION TIME FOR THE LOW PRIORITY TASK SATISFIES A SECOND PREEMPTION CONDITION — 508

IN RESPONSE TO DETERMINING THAT THE ESTIMATED PREEMPTION SAVE TIME SATISFIES THE FIRST PREEMPTION CONDITION AND DETERMINE THAT THE ESTIMATED EXECUTION TIME FOR THE LOW PRIORITY TASK SATISFIES THE SECOND PREEMPTION CONDITION, SCHEDULING A PREEMPTION EVENT ASSOCIATED WITH THE HIGH PRIORITY TASK AND THE LOW PRIORITY TASK — 510

FIG. 5

INTELLIGENT PREEMPTION SYSTEM

TECHNICAL FIELD

Embodiments herein generally relate to computer software preemption. More specifically, but not by way of limitation, embodiments herein describe a preemption system for selectively preempting a graphics processing unit (GPU).

BACKGROUND

In computer software, preemption is the act of temporarily halting a currently executing task with the intention of resuming it at a later time.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIG. 5 is an example method for selectively preempting the GPU, according to example embodiments

DETAILED DESCRIPTION

Figure 1:
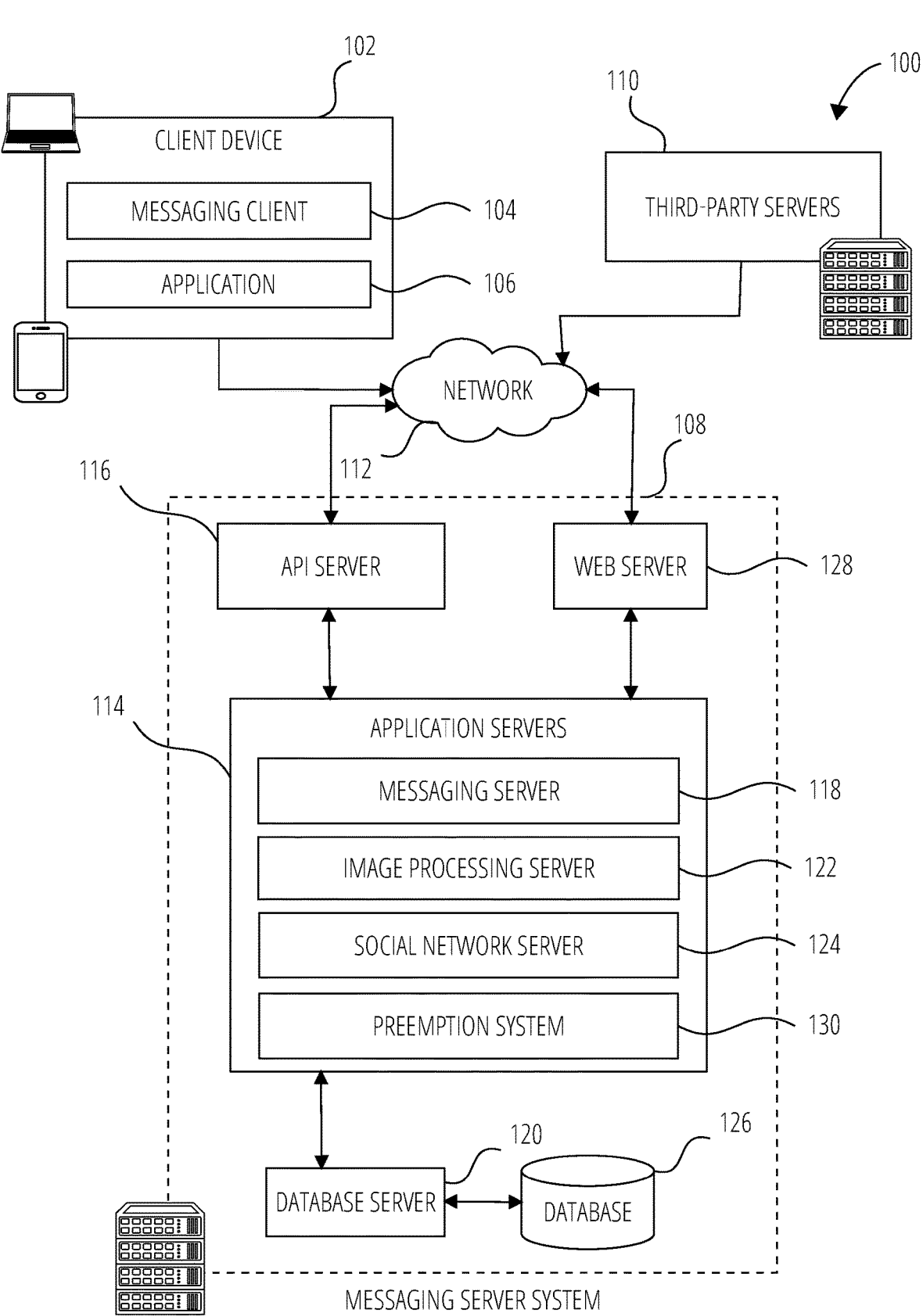
FIG. 1 is a diagrammatic representation of a networked environment in which the present disclosure may be deployed, in accordance with some examples.

An example of preemption is the process of allowing a high priority task to interrupt a low priority task. This allows the high priority job to run as soon as possible, without having to wait for a contested computing resource to idle. Preemption can be achieved in one of two ways. The first way is by discarding the low priority task and restarting it when the high priority task has completed. The second way is by saving the progress of the low priority task, and restoring it after the high priority task is finished.

Graphics Processing Unit (GPU) preemption can be achieved by saving all the progress and last state of the lower priority task and resuming it at a later time. However, the process of saving the progress and resuming the task can be computationally expensive. GPU preemption can have detrimental impacts on the performance and power consumption of a computing device based on the duration of the workload, duration of the preemption and the time of preemption.

Systems and methods herein describe an intelligent preemption system. The proposed intelligent preemption system uses additional data to estimate specific times within the duration of the workload to selectively preempt a low priority task, thus conserving power and lessening negative impacts on the performance of the GPU.

The intelligent preemption system identifies a high priority task and a low priority task that are running on the GPU. The high priority task may be a task that should be completed first or as soon as possible, in relation to other tasks. In some examples, the high priority task must be completed by a deadline or is a task that is otherwise heavily relied upon by other processes. A task may be marked as a high priority task by a human user of the intelligent preemption system. The intelligent preemption system determines whether preemption will be beneficial by estimating two key values: a preemption save time and for the low priority task and an execution time of the low priority task. The preemption save time is the time it takes to perform a preemption. For example, it is the time it takes to save the current progress of the lower priority task. The execution time of the low priority task is the total amount of time it takes to perform the low priority task. The times described herein may be GPU clock times.

The two conditions that the intelligent preemption system checks for are:

$$E(t_{PS}) > E(t_L) - t_{L0}); \text{ and}$$

$$(\min(E(t_{PS}), E(t_L) - t_{L0}) + t_H > t_V)$$

where $t_{PS}$ is the preemption save time, $t_L$ is the total execution time of the low priority task, $t_{L0}$ is the time until the low priority task is preempted, $t_H$ is the total execution time of the high priority task and $t_V$ is the time until the next deadline.

If the two conditions described above are satisfied, the intelligent preemption system preempts the low priority task with the high priority task. Further details of the intelligent preemption system are described in the paragraphs below.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, a social network server 124, and a preemption system 130. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

The social network server 124 supports various social networking functions and services and makes these functions and services available to the messaging server 118. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

The preemption system 130 determines preemption schedules for running high priority and low priority tasks on a GPU. The preemption system 130 determines the preemption schedules using a machine learning model trained on historical preemption data. The preemption system 130 thus improves performance and power of the GPU by determining the preemption schedules.

System Architecture

Figure 2:
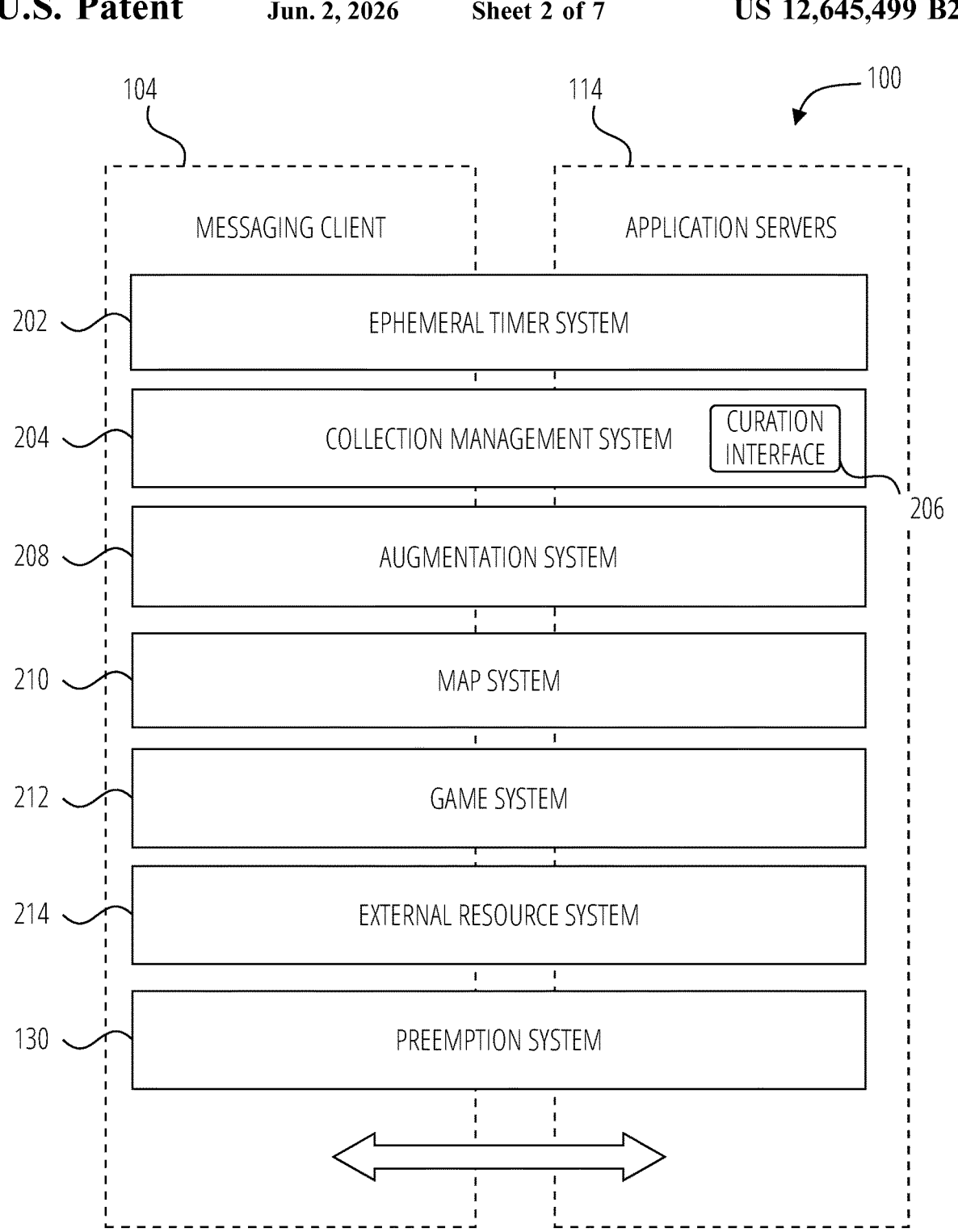
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the sever-side by the application servers 114. These subsystems include, for example, an ephemeral timer system 202, a collection management system 204, an augmentation system 208, a map system 210, a game system 212, an external resource system 214, and a preemption system 130.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display)

to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions, and supports the presentation of map-based media content and messages by the messaging client 104. For example, the map system 210 enables the display of user icons or avatars (e.g., stored in profile data 316 (deleted)) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The external resource system 214 provides an interface for the messaging client 104 to communicate with remote servers (e.g. third-party servers 110) to launch or access external resources, i.e. applications or applets. Each third-party server 110 hosts, for example, a markup language (e.g., HTML5) based application or small-scale version of an application (e.g., game, utility, payment, or ride-sharing application). The messaging client 104 may launches a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104.

In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

In some examples, the preemption system 130 is implemented on a GPU of a client device 102 (e.g., as part of a messaging client 104). In some examples, the preemption system 130 is implemented on a GPU of a server (e.g., application servers 114). In some examples, some operations of the preemption system 130 run on the GPU of a client device 102 and other operations run on the GPU of a server.

Figure 3:
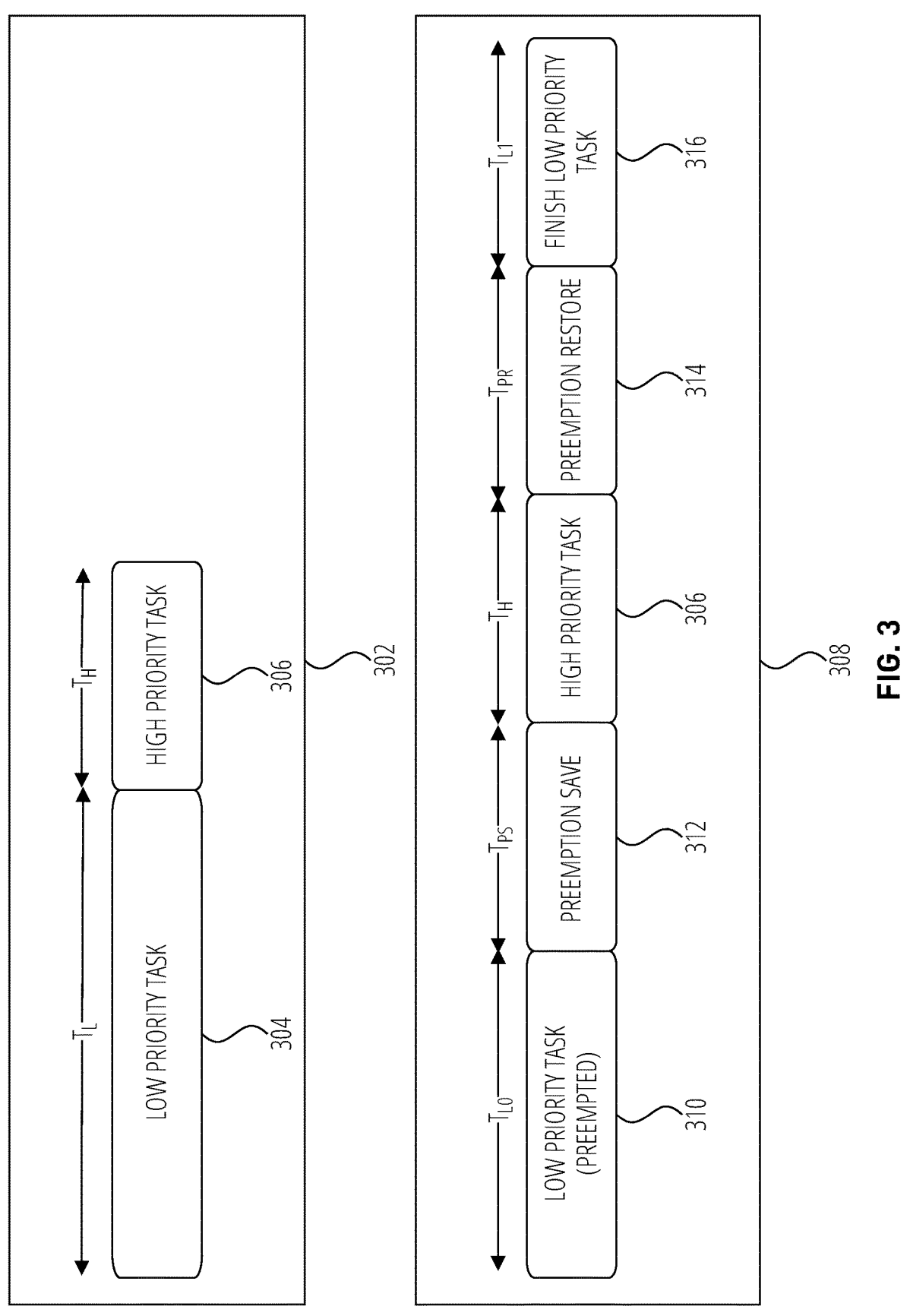
FIG. 3 is an illustration of example preemption events that are scheduled by a preemption system, according to example embodiments.

FIG. 3 is an illustration of example preemption events that are scheduled by the preemption system 130. There are times where preemption can be detrimental to performance and power consumption of the GPU depending on the duration of the GPU workload, duration of the preemption, and the time of preemption. The preemption system 130 uses additional data to estimate certain times (e.g., preemption save time, execution time of low priority task, execution time of high priority task) to make a more informed decision on preemption events. A preemption event may be a decision to initiate a preemption (e.g., a high priority task interrupts a low priority task) or a decision to avoid a preemption (e.g., allow a low priority task to complete without interruption). The preemption system 130 avoids two key preemption events: preemption near completion and preemption near deadline.

Preemption near completion is the situation during which the low priority task 304 is nearly complete and it would be preferable to complete the low priority task 304 instead of preempting it. Timeline 302 is an example schedule of a low priority task 304 and a high priority task 306 that are running on a GPU without any scheduled preemption events. Timeline 308 is an example schedule of preempting the low priority task 304 with the high priority task 306.

In timeline 308, the low priority task runs at block 310 until it is preempted at time $t_{L0}$. The current progress of the low priority task is saved at block 312 and the associated preemption save time is represented by time $t_{PS}$. The high priority task 306 interrupts the low priority task and runs until has completely executed for time $t_H$. The progress of the low priority task 304 is restored at block 314 and the associated preemption restore time is represented by time $t_{PR}$. The low priority task 304 is completed in block 314 and the associated time it takes to complete the low priority task 304 is represented by time $t_{L1}$.

As shown in FIG. 3, the timeline 302 is shorter in duration than the timeline 308. In this situation, it is preferable to avoid preemption when the low priority task 304 is nearly complete. The key condition that must be satisfied for the preemption system 130 to skip preemption near completion is when:

$$(t_{PS}>t_{L1})$$

or $(t_{PS}>(t_L-t_{L0}))$ where $t_{ps}$ is the time it takes to save the progress of the low priority task prior to preemption (e.g., preemption save time), $t_{L1}$ is the remaining time of the low priority task after preemption, and $t_{L0}$ is the time until the low priority task is preempted.

Preemption near deadline is the situation during which there is a deadline to complete the high priority task 306 by. For example, the high priority task 306 may be a vertical sync (e.g., VSync). At some point it may be impossible to meet the deadline and preempting the current task (e.g., the low priority task 304) would reduce performance of the device. The key condition for when it is better to skip preemption near deadline is when:

$$t_{PS}+t_H>t_V$$

where $t_{ps}$ is the preemption save time, $t_H$ is the total execution time of the high priority task and $t_V$ is the time until the next deadline.

Figure 4:
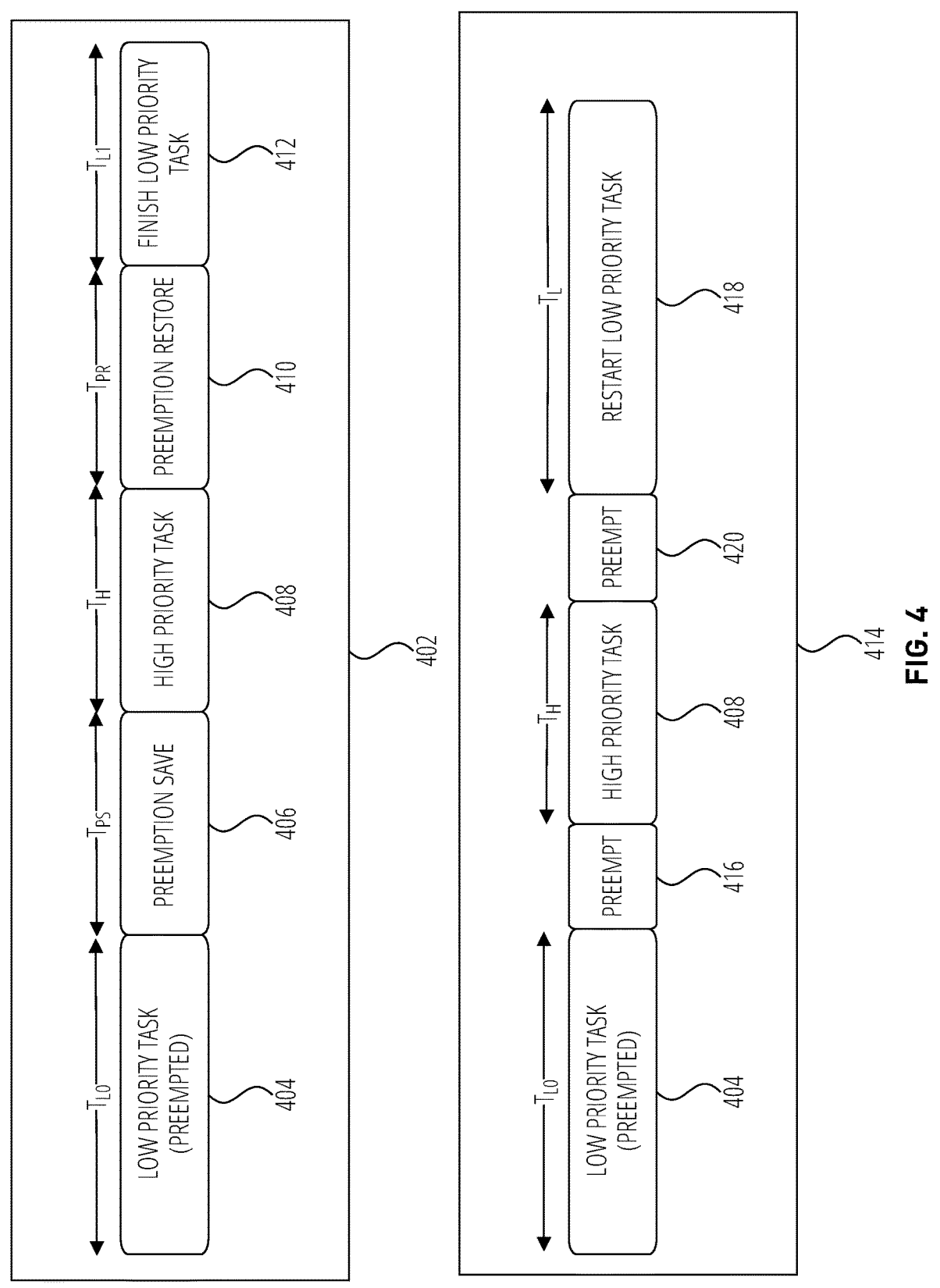
FIG. 4 is an illustration of example timelines during which a preemption system preempts a low priority task, according to example embodiments.

FIG. 4 is an illustration of example timelines during which the preemption system 130 preempts a low priority task. In some examples, the preemption system 130 preempts a low priority task near the beginning of the run time of the low priority task. In this case, it can be helpful to discard the progress of the low priority task entirely as the time required to save and restore the progress of the low priority task can be greater than time required to repeat the low priority task entirely.

Timeline 402 is an example timeline for preempting a low priority task. At block 404, the low priority task is preempted at time $t_{L0}$ and at block 406, the current progress of the low priority is saved at time $t_{PS}$. At block 408 the high priority task is executed for a duration of time $t_H$ and upon completion of the high priority task, the progress of the low priority task is restored at block 410 at time $t_{PR}$. At block 412, the low priority task is completed for a duration of time $t_{L1}$.

In contrast, timeline 414, is an example timeline of the preemption system 130 preempting a low priority task near the beginning of the task and discarding the current progress of the low priority task. At block 404, the low priority task is preempted at time $t_{L0}$. The preemption event is scheduled at block 416 and the high priority task 408 is executed until it's completion at time $t_H$. At block 420, the preemption event ends, and the low priority work is restarted at block 418 and runs until its completion at time $t_L$.

As shown in FIG. 4, the timeline 414 allows the high priority task 408 and the low priority task to be completed earlier than in timeline 402. The key condition that must be satisfied for the preemption system 130 to perform a preemption near the beginning is:

$$t_{L0}+t_{Penalty}<t_{PS}+t_{PR}$$

where $t_{L0}$ is the time until the low priority task is preempted, $t_{Penalty}$ is the time to discard and repeat the work, $t_{PS}$ is the preemption save time, and $t_{PR}$ is the preemption restore time.

Although the described flow diagram below can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

FIG. 5 is an example method 500 for selectively preempting the GPU, according to example embodiments. The method 500 may be performed by a GPU on a client device, a GPU on a server, or any combination thereof. The method 500 may be implemented within the GPU microcode, the GPU kernel driver, or any combination thereof.

At operation 502, the preemption system 130 identifies a high priority task and a low priority task that are concurrently running on a processor. For example, the processor is GPU.

At operation 504, the preemption system 130 estimates a preemption save time and an execution time for the low priority task using a machine learning model trained to analyze historical preemption data. The preemption save time is the time it takes to save the progress of the low priority task until the preemption event is scheduled. The execution time for the low priority task is the total duration of time for the low priority task. In some examples, the preemption system 130 further estimates an execution time for the high priority task using the machine learning model. In some examples, at least one of the estimated preemption save time, the estimated execution time for the low priority task and the estimated execution time for the high priority task are received as input by a user of a client device.

The machine learning model may be a recurrent neural network. In some examples, the historical preemption data includes but is not limited to: the average amount time it takes for the high priority task to run (e.g., average execution time for the high priority task) and the average execution time for the low priority task, average preemption save time for the low priority task, and the average restore time for the low priority task.

At operation 506, the preemption system 130 determines that the estimate preemption save time for the low priority task satisfies a first preemption condition. The first condition may be as follows:

$$E(t_{PS}) > E(t_L) - t_{L0};$$

where $t_{PS}$ is the preemption save time, $t_L$ is the total execution time of the low priority task, and $t_{L0}$ is the time until the low priority task is preempted.

At operation 508, the preemption system 130 determines that the estimated execution time for the low priority task satisfies a second preemption condition. The second condition may be as follows:

$$(\min(E(t_{PS}), E(t_L) - t_{L0}) + t_H > t_V)$$

where $t_{PS}$ is the preemption save time, $t_L$ is the total execution time of the low priority task, $t_{L0}$ is the time until the low priority task is preempted, $t_H$ is the total execution time of the high priority task and $t_V$ is the time until the next deadline.

At operation 510, in response to determining that the estimated preemption save time satisfies the first preemption condition and determines that the estimated execution time for the low priority task satisfies the second preemption condition, the preemption system 130 schedules a preemption event associated with the high priority task and the low priority task. The preemption event may be a decision by the preemption system 130 to allow the high priority task to interrupt the low priority task at a specified time. The preemption event may be a decision to allow the low priority task to complete without being preempted by the high priority task. For example, the preemption event may be any of the preemption events described in connection with FIGS. 3-4.

In some examples, the preemption system 130 may estimate $t_L$ such that $E(t_L) > t_L$. In this case the preemption system 130 overestimates $t_L$, and will perform a traditional preemption as the conditions above may not be satisfied. A traditional preemption is when a low priority task is preempted at time $t_{L0}$, and the progress of the low priority task is saved for time $t_{PS}$. Subsequently, the high priority task is executed for time $t_H$ and upon completion of the high priority task, the progress of the low priority task is restored for the duration of time $t_{PR}$. Subsequently, the low priority task is completed for the duration of time $t_{L1}$.

In some examples, the preemption system 130 may estimate $t_{PS}$ such that $E(t_{PS}) > t_{PS}$. In this case, the preemption system 130 underestimates $t_{PS}$ and will perform the traditional preemption as the two conditions described above, may not be satisfied.

In some examples, the preemption system 130 may estimate $t_{PS}$ such that $E(t_{PS}) < t_{PS}$. In this case, the preemption system 130 overestimates $t_{PS}$ and may skip preemption altogether. Although in this case the high priority task may be delayed, the preemption system 130 saves power consumption of the GPU by not having to preempt the lower priority task which may be closer to completion.

In some examples, the preemption system 130 may estimate $t_L$ such that $E(t_L) < t_L$. In this case, the preemption system 130 underestimates $t_L$. In this situation, the preemption system 130 may require additional feedback from the user (e.g., a deadline that the high priority task needs to be finished by) in order to assist in making a more informed decision.

Machine Architecture

Figure 6:
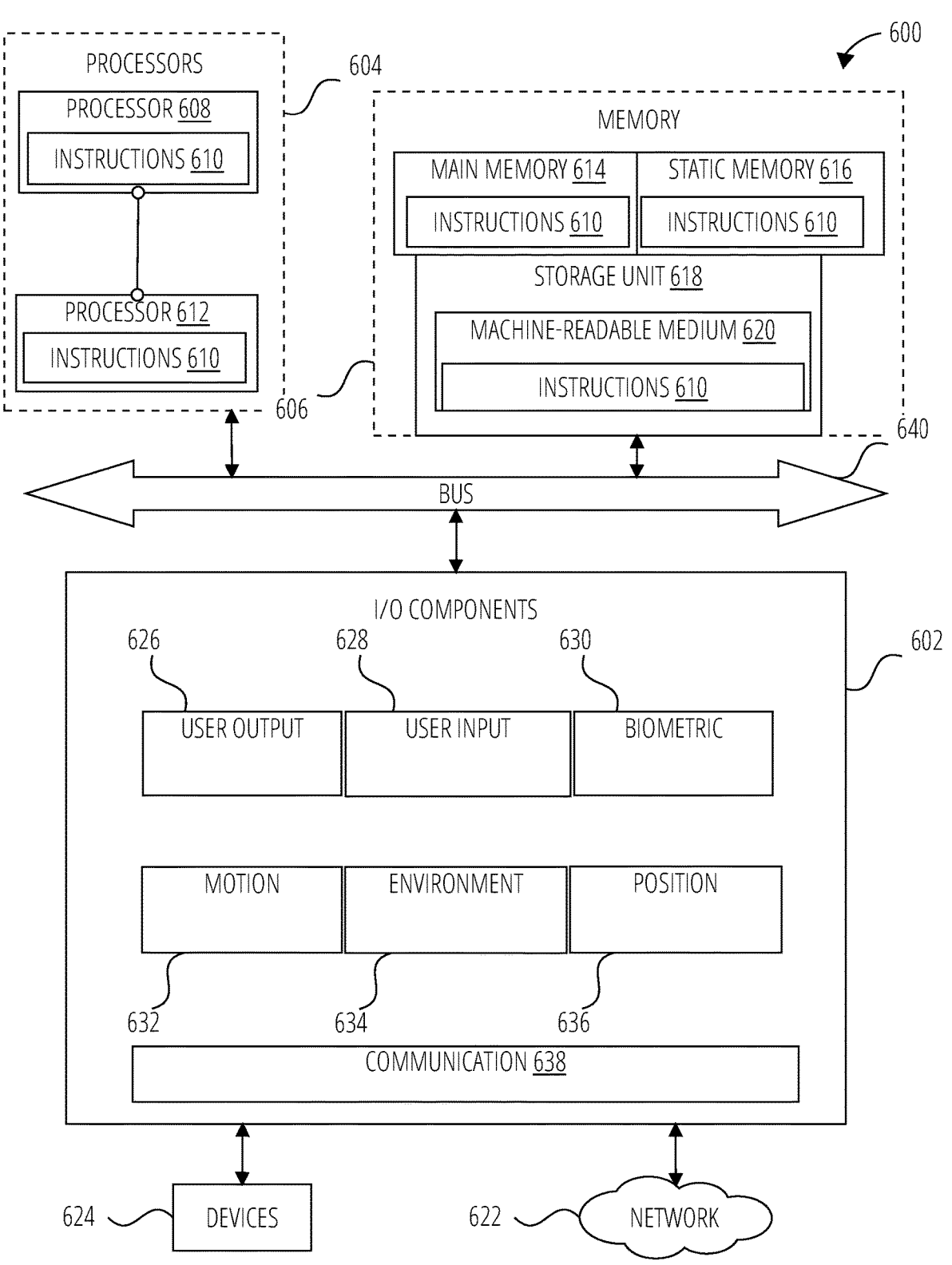
FIG. 6 is a diagrammatic representation of a machine in the form of a computer system within which a set of instructions may be executed for causing the machine to perform any one or more of the methodologies discussed herein, in accordance with some examples.

FIG. 6 is a diagrammatic representation of the machine 600 within which instructions 610 (e.g., software, a program, an application, an applet, an app, or other executable code) for causing the machine 600 to perform any one or more of the methodologies discussed herein may be executed. For example, the instructions 610 may cause the machine 600 to execute any one or more of the methods described herein. The instructions 610 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 610, sequentially or otherwise, that specify actions to be taken by the machine 600. Further, while only a single machine 600 is illustrated, the term "machine" shall also be taken to include a collection of machines that individually or jointly execute the instructions 610 to perform any one or more of the methodologies discussed herein. The machine 600, for example, may comprise the client device 102 or any one of a number of server devices forming part of the messaging server system 108. In some examples, the machine 600 may also comprise both client and server systems, with certain operations of a particular method or algorithm being performed on the server-side and with certain operations of the particular method or algorithm being performed on the client-side.

The machine 600 may include processors 604, memory 606, and input/output I/O components 602, which may be configured to communicate with each other via a bus 640. In an example, the processors 604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 608 and a processor 612 that execute the instructions 610. The term "processor" is intended to include multi-core processors that may comprise two or more independent processors (sometimes referred to as "cores") that may execute instructions contemporaneously. Although FIG. 6 shows multiple processors 604, the machine 600 may include a single processor with a single-core, a single processor with multiple cores (e.g., a multi-core processor), multiple processors with a single core, multiple processors with multiples cores, or any combination thereof.

The memory 606 includes a main memory 614, a static memory 616, and a storage unit 618, both accessible to the processors 604 via the bus 640. The main memory 606, the static memory 616, and storage unit 618 store the instructions 610 embodying any one or more of the methodologies or functions described herein. The instructions 610 may also reside, completely or partially, within the main memory 614, within the static memory 616, within machine-readable medium 620 within the storage unit 618, within at least one of the processors 604 (e.g., within the Processor's cache memory), or any suitable combination thereof, during execution thereof by the machine 600.

The I/O components 602 may include a wide variety of components to receive input, provide output, produce output, transmit information, exchange information, capture measurements, and so on. The specific I/O components 602 that are included in a particular machine will depend on the type of machine. For example, portable machines such as mobile phones may include a touch input device or other such input mechanisms, while a headless server machine will likely not include such a touch input device. It will be appreciated that the I/O components 602 may include many other components that are not shown in FIG. 6. In various examples, the I/O components 602 may include user output components 626 and user input components 628. The user output components 626 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 628 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 602 may include biometric components 630, motion components 632, environmental components 634, or position components 636, among a wide array of other components. For example, the biometric components 630 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 632 include acceleration sensor components (e.g., accelerometer), gravitation sensor components, rotation sensor components (e.g., gyroscope).

The environmental components 634 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 636 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 602 further include communication components 638 operable to couple the machine 600 to a network 622 or devices 624 via respective coupling or connections. For example, the communication components 638 may include a network interface Component or another suitable device to interface with the network 622. In further examples, the communication components 638 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 624 may be another machine or any of a wide variety of peripheral devices (e.g., a peripheral device coupled via a USB).

Moreover, the communication components 638 may detect identifiers or include components operable to detect identifiers. For example, the communication components 638 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 638, such as location via Internet Protocol (IP) geolocation, location via Wi-Fi® signal triangulation, location via detecting an NFC beacon signal that may indicate a particular location, and so forth.

The various memories (e.g., main memory 614, static memory 616, and memory of the processors 604) and storage unit 618 may store one or more sets of instructions and data structures (e.g., software) embodying or used by any one or more of the methodologies or functions described herein. These instructions (e.g., the instructions 610), when executed by processors 604, cause various operations to implement the disclosed examples.

The instructions 610 may be transmitted or received over the network 622, using a transmission medium, via a network interface device (e.g., a network interface component included in the communication components 638) and using any one of several well-known transfer protocols (e.g., hypertext transfer protocol (HTTP)). Similarly, the instructions 610 may be transmitted or received using a transmission medium via a coupling (e.g., a peer-to-peer coupling) to the devices 624.

Software Architecture

Figure 7:
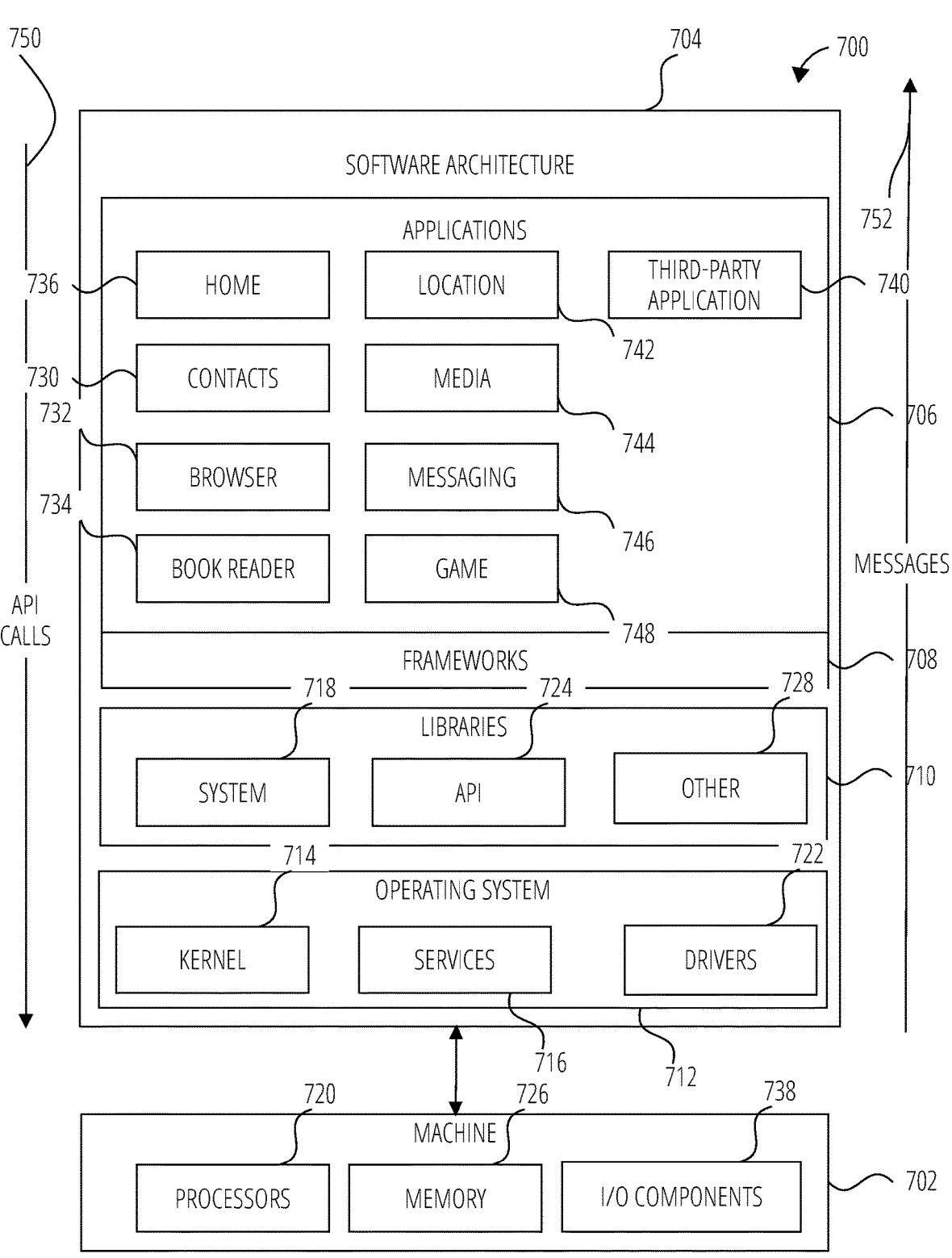
FIG. 7 is a block diagram showing a software architecture within which examples may be implemented.

FIG. 7 is a block diagram 700 illustrating a software architecture 704, which can be installed on any one or more of the devices described herein. The software architecture 704 is supported by hardware such as a machine 702 that includes processors 720, memory 726, and I/O components 738. In this example, the software architecture 704 can be conceptualized as a stack of layers, where each layer provides a particular functionality. The software architecture 704 includes layers such as an operating system 712, libraries 710, frameworks 708, and applications 706. Operationally, the applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionality. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 710 provide a common low-level infrastructure used by the applications 706. The libraries 710 can include system libraries 718 (e.g., C standard library) that provide functions such as memory allocation functions, string manipulation functions, mathematic functions, and the like. In addition, the libraries 710 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 710 can also include a wide variety of other libraries 728 to provide many other APIs to the applications 706.

The frameworks 708 provide a common high-level infrastructure that is used by the applications 706. For example, the frameworks 708 provide various graphical user interface (GUI) functions, high-level resource management, and high-level location services. The frameworks 708 can provide a broad spectrum of other APIs that can be used by the applications 706, some of which may be specific to a particular operating system or platform.

In an example, the applications 706 may include a home application 736, a contacts application 730, a browser application 732, a book reader application 734, a location application 742, a media application 744, a messaging application 746, a game application 748, and a broad assortment of other applications such as a third-party application 740. The applications 706 are programs that execute functions defined in the programs. Various programming languages can be employed to create one or more of the applications 706, structured in a variety of manners, such as object-oriented programming languages (e.g., Objective-C, Java, or C++) or procedural programming languages (e.g., C or assembly language). In a specific example, the third-party application 740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 740 can invoke the API calls 750 provided by the operating system 712 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:

identifying, by a graphics processing unit (GPU), a high priority task and a low priority task that are running on the GPU;

monitoring, by the GPU, performance metrics of the low priority task;

estimating, by the GPU, a preemption save time and an execution time for the low priority task using a machine learning model trained to analyze historical preemption data;

based on the monitored performance metrics, determining, by the GPU, that the estimated preemption save time for the low priority task satisfies a first preemption condition, the first preemption condition comprising the estimated preemption save time for the low priority task exceeds the estimated execution time less a time until the low priority task is interrupted exceeding;

determining, by the GPU, that the estimated execution time for the low priority task satisfies a second preemption condition;

in response to determining that the estimated preemption save time satisfies the first preemption condition and determining that the estimated execution time for the low priority task satisfies the second preemption condition, scheduling, by the GPU, a preemption event associated with the high priority task and the low priority task; and executing, by the GPU, the preemption event to switch execution from the low priority task to the high priority task on the GPU at a specified time.

2. The method of claim 1, wherein the machine learning model is a recurrent neural network.

3. The method of claim 1, further comprising:

estimating an execution time for the high priority task using the machine learning model.

4. The method of claim 1, further comprising:

receiving the preemption save time and the execution time for the low priority task as input from a user of a client device.

5. The method of claim 1, wherein the second preemption condition comprises a time until a deadline exceeding the estimated execution time less the time until the low priority task is interrupted plus an estimated execution time of the high priority task.

6. The method of claim 1, wherein the preemption save time and execution time for the low priority task are estimated based on at least one of: GPU clock cycles, memory usage, or task progress state.

7. The method of claim 6, wherein the historical preemption data comprises an average amount of time that the high priority task uses the GPU.

8. A system comprising:

a graphics processing unit (GPU); and a memory storing instructions that, when executed by the GPU, cause the system to:

identify, by the GPU a high priority task and a low priority task that are running on the GPU, monitor, by the GPU, performance metrics of the low priority task;

estimate, by the GPU, a preemption save time and an execution time for the low priority task using a machine learning model trained to analyze historical preemption data;

based on the monitored performance metrics, etermine, by the GPU, that the estimated preemption save time for the low priority task satisfies a first preemption condition, the first preemption condition comprising the estimated preemption save time for the low priority task exceeds the estimated execution time less a time until the low priority task is interrupted exceeding;

determine, by the GPU, that the estimated execution time for the low priority task satisfies a second preemption condition;

in response to determining that the estimated preemption save time satisfies the first preemption condition and determining that the estimated execution time for the low priority task satisfies the second preemption condition, schedule, by the GPU, a preemption event associated with the high priority task and the low priority task; and execute, by the GPU, the preemption event to switch execution from the low priority task to the high priority task on the GPU at a specified time .

9. The system of claim 8, wherein the machine learning model is a recurrent neural network.

10. The system of claim 8, wherein the instructions further configure the system to:

estimate an execution time for the high priority task using the machine learning model.

11. The system of claim 8, wherein the instructions further cause the system to:

receive the preemption save time and the execution time for the low priority task as input from a user of a client device.

12. The system of claim 8, wherein the second preemption condition comprises a time until a deadline exceeding the estimated execution time less the time until the low priority task is interrupted plus an estimated execution time of the high priority task.

13. The system of claim 8, wherein the preemption save time and execution time for the low priority task are estimated based on at least one of: GPU clock cycles, memory usage, or task progress state.

14. The system of claim 13, wherein the historical preemption data comprises an average amount of time that the high priority task uses the GPU.

15. A non-transitory computer-readable storage medium, the computer-readable storage medium including instructions that when executed by a computer, cause the computer to:

identify, by a graphics processing unit (GPU), a high priority task and a low priority task that are running on the GPU;

monitor, by the GPU, performance metrics of the low priority task;

estimate, by the GPU, a preemption save time and an execution time for the low priority task using a machine learning model trained to analyze historical preemption data;

based on the monitored performance metrics, determine, by the GPU, that the estimated preemption save time for the low priority task satisfies a first preemption condition, the first preemption condition comprising the estimated preemption save time for the low priority task exceeds the estimated execution time less a time until the low priority task is interrupted exceeding;

determine, by the GPU, that the estimated execution time for the low priority task satisfies a second preemption condition;

in response to determining that the estimated preemption save time satisfies the first preemption condition and determining that the estimated execution time for the low priority task satisfies the second preemption condition, schedule, by the GPU, a preemption event associated with the high priority task and the low priority task; and execute, by the GPU, the preemption event to switch execution from the low priority task to the high priority task on the GPU at a specified time.

16. The computer-readable storage medium of claim 15, wherein the machine learning model is a recurrent neural network.

17. The computer-readable storage medium of claim 15, wherein the instructions further cause the computer to:

estimate an execution time for the high priority task using the machine learning model.

18. The computer-readable storage medium of claim 15, wherein the instructions further cause the computer to:

receive the preemption save time and the execution time for the low priority task as input from a user of a client device.

19. The computer-readable storage medium of claim 15, wherein the second preemption condition comprises a time until a deadline exceeding the estimated execution time less the time until the low priority task is interrupted plus an estimated execution time of the high priority task.

20. The computer-readable storage medium of claim 15, wherein the preemption save time and execution time for the low priority task are estimated based on at least one of: GPU clock cycles, memory usage, or task progress state.

* * * * *